United States Patent
Tsai et al.

(10) Patent No.: US 8,320,067 B1
(45) Date of Patent: Nov. 27, 2012

(54) REFRESH OPERATIONS USING WRITE/READ COMMANDS

(75) Inventors: Chun Sei Tsai, Tustin, CA (US); Sang Huynh, Corona, CA (US); Kenneth J. Smith, Corona, CA (US); Carl E. Barlow, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 12/782,681

(22) Filed: May 18, 2010

(51) Int. Cl.
*G11B 27/36* (2006.01)
(52) U.S. Cl. ............... 360/31; 360/48; 360/53; 360/62; 360/77.02
(58) Field of Classification Search .................. None
See application file for complete search history.

(56) References Cited

U.S. PATENT DOCUMENTS

| | | | |
|---|---|---|---|
| 5,909,334 A | 6/1999 | Barr et al. | |
| 6,289,484 B1 | 9/2001 | Rothberg et al. | |
| 6,327,106 B1* | 12/2001 | Rothberg | 360/53 |
| 6,429,984 B1 | 8/2002 | Alex | |
| 6,462,896 B1 | 10/2002 | Codilian et al. | |
| 6,628,466 B2 | 9/2003 | Alex | |
| 6,650,492 B2 | 11/2003 | Lenny et al. | |
| 6,691,255 B1 | 2/2004 | Rothberg et al. | |
| 6,781,780 B1 | 8/2004 | Codilian | |
| 6,809,893 B2* | 10/2004 | Uzumaki et al. | 360/31 |
| 6,854,022 B1* | 2/2005 | Thelin | 710/5 |
| 6,854,071 B2 | 2/2005 | King et al. | |
| 6,950,967 B1 | 9/2005 | Brunnett et al. | |
| 6,987,630 B1 | 1/2006 | Higgins et al. | |
| 7,043,598 B2* | 5/2006 | Wu et al. | 711/106 |
| 7,050,252 B1 | 5/2006 | Vallis | |
| 7,173,782 B2* | 2/2007 | Ikeda et al. | 360/31 |
| 7,177,979 B2* | 2/2007 | Kuwamura | 711/112 |
| 7,196,860 B2* | 3/2007 | Alex | 360/31 |
| 7,345,837 B1* | 3/2008 | Schreck et al. | 360/31 |
| 7,349,179 B1 | 3/2008 | He et al. | |
| 7,570,445 B2* | 8/2009 | Alfred et al. | 360/31 |
| 7,649,704 B1* | 1/2010 | Bombet et al. | 360/31 |
| 7,663,933 B2* | 2/2010 | Tsukazaki et al. | 365/185.25 |
| 7,672,072 B1 | 3/2010 | Boyle et al. | |
| 7,870,460 B2* | 1/2011 | Iketaki et al. | 714/754 |
| 7,872,822 B1* | 1/2011 | Rothberg | 360/31 |
| 7,945,727 B2 | 5/2011 | Rothberg et al. | |
| 7,974,029 B2 | 7/2011 | Tsai et al. | |
| 2004/0128433 A1* | 7/2004 | Bains | 711/106 |
| 2004/0268033 A1* | 12/2004 | Chia et al. | 711/112 |
| 2005/0207049 A1* | 9/2005 | Ikeda et al. | 360/31 |
| 2008/0239808 A1* | 10/2008 | Lin | 365/185.09 |
| 2009/0027799 A1* | 1/2009 | Rothberg et al. | 360/75 |
| 2009/0244775 A1* | 10/2009 | Ehrlich | 360/135 |
| 2010/0165502 A1* | 7/2010 | Iketaki et al. | 360/72.1 |
| 2011/0019302 A1* | 1/2011 | Aoki et al. | 360/39 |

* cited by examiner

*Primary Examiner* — Dismery Mercedes

(57) ABSTRACT

Systems and methods for performing refresh operations using write/read commands are provided. In one embodiment, a disk drive comprises a disk partitioned into a plurality of refresh zones, a head configured to write data to and read data from the disk, and a controller. The controller is configured to receive an access command, to read data from at least one of the refresh zones using the head in response to the access command, to check a condition of the read data, and to determine whether to refresh the at least one refresh zone based on the condition of the read data, wherein the read data includes data from a portion of the at least one refresh zone not being accessed by the access command.

23 Claims, 3 Drawing Sheets

REFRESH OPERATIONS USING WRITE/READ COMMANDS

BACKGROUND

A disk drive comprises a rotating disk and a head over the disk to magnetically write to and read data from the disk. The head may be connected to a distal end of an actuator arm that is rotated about a pivot to position the head radially over the disk. The disk may comprise a plurality of radially spaced, concentric tracks for recording data and servo information on the disk. The servo information may be read by the head to determine the position of the head over the disk and processed by a servo control system to position the head over a desired track.

During a write operation, a current is applied to a write element of the head (e.g., a write coil) to create a magnetic field which magnetizes the surface of the disk by orienting the direction of magnetic grains (e.g., horizontally in longitudinal magnetic recording, or vertically in perpendicular magnetic recording). The orientation of the grains exhibits hysteresis thereby generating their own magnetic field when the write magnetic field is removed. During a read operation, a read element of the head (e.g., a magnetoresistive element) transduces the magnetic field emanating from the disk surface into a read signal that is demodulated into an estimated data sequence.

The hysteresis of the magnetic grains is not permanent meaning that over time the grains will orientate into random directions (magnetic entropy) until the magnetic field is no longer sensed reliably (leading to data errors during reproduction). Magnetic entropy may also be precipitated by various factors, such as increasing ambient temperature. That is, at higher temperatures the uniform alignment of the grains will degrade faster. Another factor that precipitates magnetic entropy is a phenomenon referred to as adjacent track interference (ATI) wherein when writing data to a target track, the fringe field from the write element degrades the uniform alignment of the grains recorded in an adjacent track. The degrading effect of ATI on the adjacent tracks compounds over time with each write operation to the target track. Eventually, the magnetic field emanating from the disk surface will deteriorate to the point that the data is no longer recoverable.

To protect the integrity of data within an area of the disk against degradation over time, the data may be refreshed, in which the data is read from the disk and rewritten back to the disk. The refresh operation may be performed in the background, for example, after a certain number of writes are made within the area of the disk and/or other areas of the disk located near the area of the disk. The disk drive may perform refresh operations for many areas of the disk in the background to protect the data integrity of the disk.

However, when the disk drive is busy handling host commands, the user may experience an undesirable slow down of the command execution time while the disk drive initiates and executes refresh operations in the background. In a high duty cycle, heavy workload environment, the disk drive may need to throttle back user bandwidth in order to perform refresh operations. The refresh operations can sap the drive performance and at times shut down the drive.

Therefore, there is a need to protect the data integrity of a disk while reducing the negative impact of refresh operations on command execution time.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
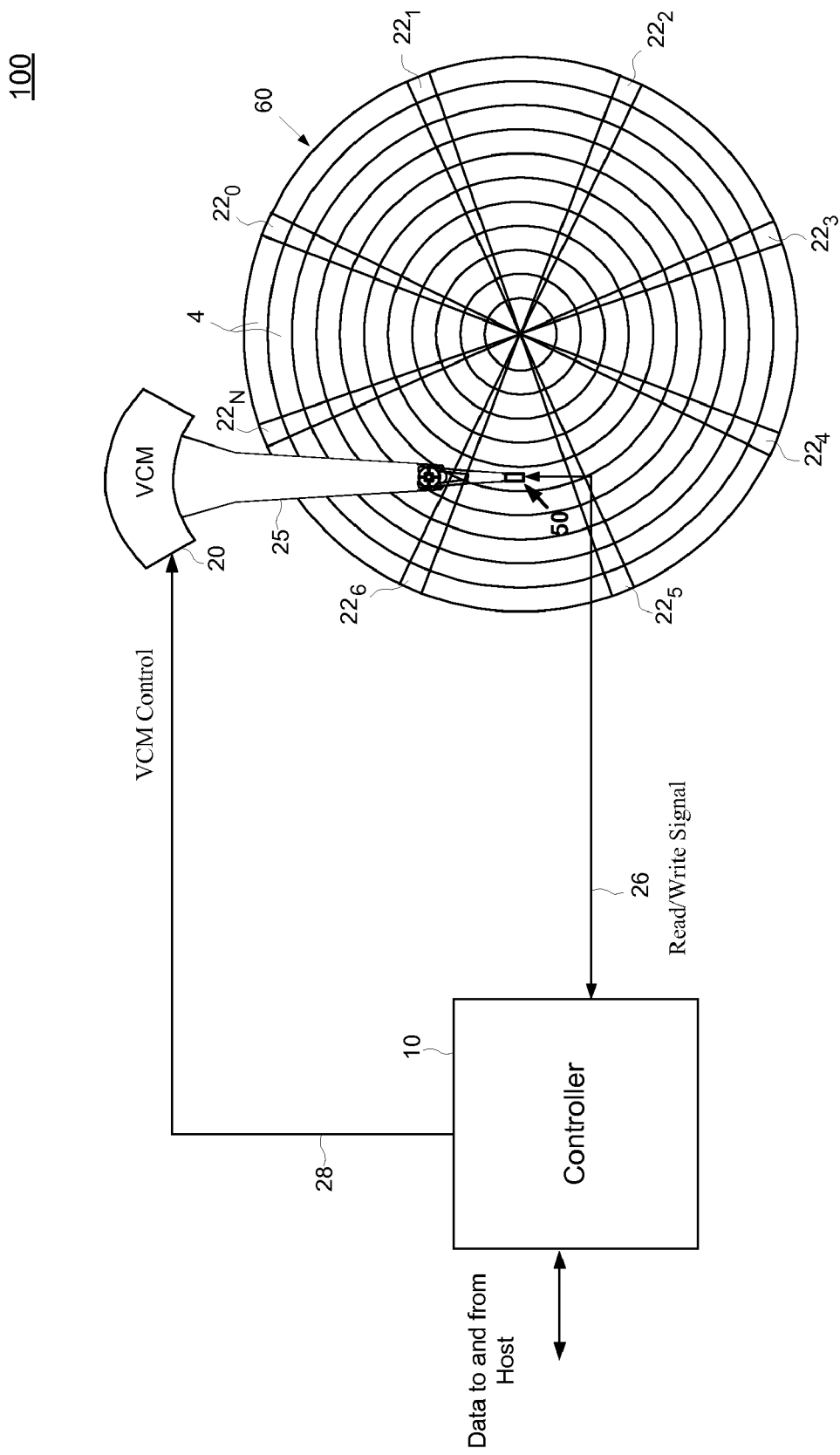
FIG. 1 is a block diagram of a disk drive according to an embodiment of the present invention.

FIG. 1 shows a disk drive 100 according to an embodiment of the present invention. The disk drive 100 comprises a rotating magnetic disk 60 and a head 50 connected to the distal end of an actuator arm 25. The actuator arm 25 is rotated about a pivot by a voice coil motor (VCM) 20 to position the head 50 radially over the disk 60. The disk 60 comprises a number of radially spaced, concentric tracks 4. Each track 4 may be partitioned into a number of data sectors (not shown) that are spaced circumferentially along the track 4. The disk 60 may also comprise a plurality of embedded servo sectors $22_0$-$22_N$, each of which may include position information that can be read from the disk 60 by the head 50 to determine the position of the head 50 over the disk 60.

The disk drive 100 also comprises a controller 10 that performs various operations of the disk drive 100 described herein. The controller 10 may be implemented using one or more processors for executing instructions and may further include memory, such as a volatile or non-volatile memory, for storing data (e.g., data being processed) and/or instructions. The instructions may be executed by the one or more processors to perform the various functions of the controller 10 described herein. The one or more processors may include a microcontroller, a Digital Signal Processor (DSP), an Application Specific Integrated Circuit (ASIC), a Field Programmable Gate Array (FPGA), hard-wired logic, analog circuitry and/or a combination thereof.

To write data to the disk 60, the controller 10 may first position the head 50 at a desired track 4 on the disk 60 by sending a control signal 28 to the VCM 20. The controller 10 may include a servo control system that positions the head 50 using the VCM 20 based on position information read from one or more embedded servo sectors $22_0$-$22_N$. The controller 10 processes data to be written to the disk 60 into a write signal 26, which is outputted to the head 50. The head 50 converts the write signal 26 into a magnetic field that magnetizes the surface of the disk 60 based on the write signal, thereby magnetically writing the data to the disk 60.

To read data from the disk 60, the controller 10 positions the head 50 at a desired data track 4 on the disk 60. The head 50 generates a read signal based on the magnetization of the disk surface under the head 50. The controller 10 receives and processes the read signal 26 into a data sequence.

The controller 10 may write data to and read data from the disk 60 in response to write/read commands from a host (e.g., host processor). For example, the controller 10 may receive a host write command including data to be written to the disk 60, and execute the host write command by writing the data to the disk 60. The controller 10 may also receive a host read command requesting data stored on the disk 60, and execute the host read command by reading the requested data from the disk 60 and sending the read data to the host. The host may address data in write/read commands using logical block addresses (LBAs). The controller 10 may maintain an address table mapping the LBAs from the host to physical addresses of the corresponding data on the disk 60, and use the address table to locate data on the disk 60 requested by a host read command. The use of LBAs allows the host to address data stored in the disk drive 100 without having to know the physical locations of the data on the disk 60.

The controller 10 may store write/read commands received from the host in a command queue and execute the write/read commands in the command queue in an order determined by a rotational positioning optimization (RPO) algorithm. The RPO algorithm may place the write/read commands in an order that minimizes mechanical latencies between commands. The mechanical latencies may include seek latency for the head 50 to seek to a track 4 corresponding to a command, rotational latency for the disk 60 to rotate so that the head 50 reaches a data sector corresponding to a command, and/or other latencies.

Figure 2:
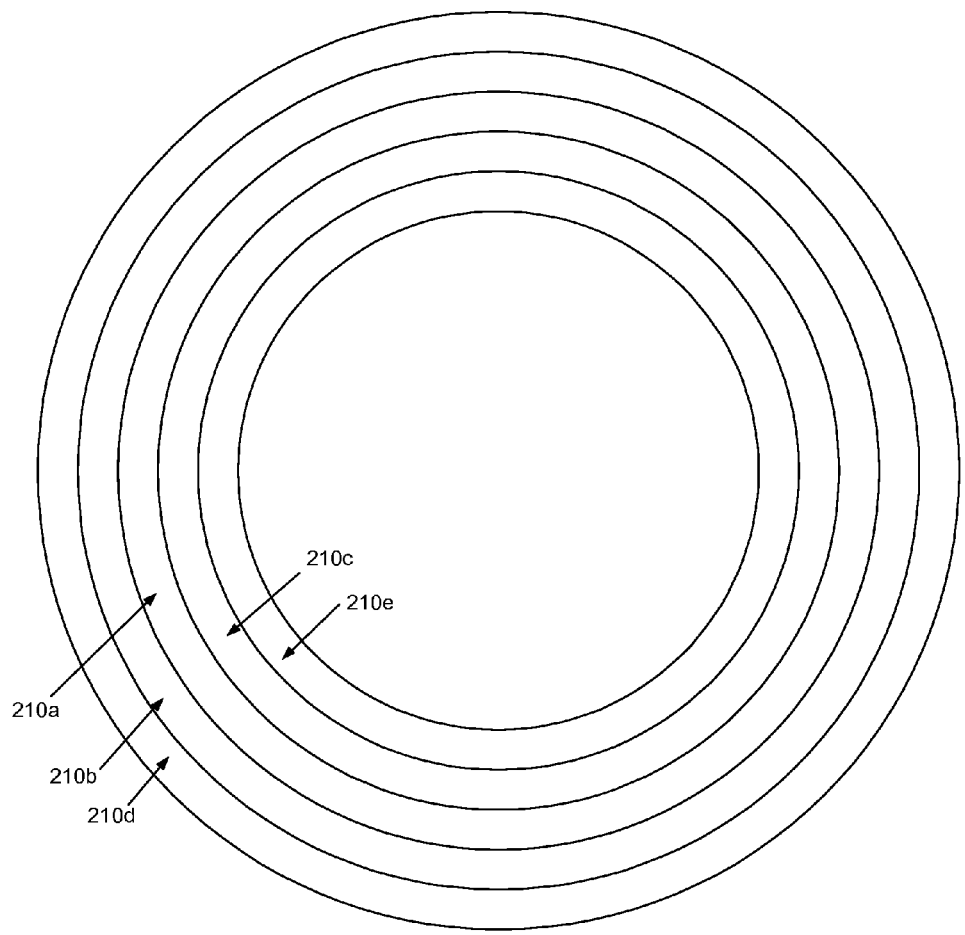
FIG. 2 shows an example of refresh zones according to an embodiment of the present invention.

In one embodiment, the disk 60 may be partitioned into a plurality of refresh zones, which may also be referred to as zip codes. FIG. 2 shows an example of five refresh zones 210a-210e. Each refresh zone 210a-210e may comprise one or more tracks 4 of the disk 60. Although five refresh zones 210a-210e are shown in FIG. 2 for ease of discussion, those skilled in the art will appreciate that the disk 60 may include any number of refresh zones.

To protect the integrity of data in the refresh zones 210a-210e, the controller 10 may maintain a refresh counter for each refresh zone 210a-210e, in which the count value of the refresh counter indicates whether the respective refresh zone needs to be refreshed. In one embodiment, the controller 10 may increase the count values of refresh counters for particular refresh zones 210a when the controller 10 detects an event that contributes to data degradation in the refresh zones 210a-210e. The refresh counters may be stored in any type of memory including random access memory, solid state memory and/or other type of memory.

For example, when data is written to refresh zone 210a, the controller 10 may increase the count values of the refresh counters for refresh zones 210b-210e, which are located near refresh zone 210a. The refresh zone 210a being written to may be referred to as the target refresh zone. In this example, the controller 10 increases the count values for refresh zones 210b-210e to account for ATI from refresh zone 210a. Since the affect of ATI dissipates as the distance from the target refresh zone 210a increases, the controller 10 may increase the count values for refresh zones 210b and 210c by a greater amount than the count values for refresh zones 210d and 210e, which are located farther away from the refresh zone 210a and are therefore less affected by ATI from refresh zone 210a. In this example, the controller 10 may also increase the count value for refresh zone 210a. This is because, when data is written to a portion of the refresh zone 210a, the fringe field from the write element of the head 50 may degrade data in other portions of the refresh zone 210a. The count values for refresh zones 210a-210e may also be increased to account for degradation due to wide area track erasure (WATER). Thus, the controller 10 can update the refresh counters by monitoring the frequency of write operations to the refresh zones 210a-210e. One skilled in the art will recognize that other methods and/or factors for updating the refresh counters may also be used.

The controller 10 may use the refresh counters to refresh the data stored in the corresponding refresh zones 210a-210e. For example, when the count value of a refresh counter exceeds a first threshold, the controller 10 may check the condition of the data in the corresponding refresh zone 210a-210e to determine whether the refresh zone needs to be refreshed. If the condition of the data is bad, then the controller 10 may refresh the refresh zone 210a-210e by reading data from the refresh zone 210a-210e and rewriting the read data back to the refresh zone 210a-210e. After the refresh, the controller 10 may clear the refresh counter back to zero. If the condition of the data is good, then the controller 10 may hold off refreshing the refresh zone 210a-201e, for example, until the count value of the refresh counter exceeds a higher threshold. Examples of methods for determining the condition of data in a refresh zone 210a-210e are provided below.

In another example, when the count value of a refresh counter exceeds a second threshold, the controller 10 may refresh the corresponding refresh zone 210a-210e. In this example, the controller 10 may perform the refresh operation by reading the data from the refresh zone 210a-210e and outputting a write command to the command queue for rewriting the read data back to the refresh zone 210a-210e. In this example, the controller 10 may use an RPO algorithm to order the write command for the refresh with other pending commands. In one embodiment, the controller 10 may wait until an idle mode of the disk drive to perform the refresh operation, during which time the disk drive is not processing a host command. When the count values of two or more refresh counters exceed the second threshold, the controller 10 may sort the corresponding refresh operations such that a refresh zone having a count value is refreshed sooner. After a refresh zone 210a-210e is refreshed, the corresponding refresh counter may be cleared back to zero.

In another example, when the count value of a refresh counter exceeds a third threshold, the controller 10 may immediately refresh the corresponding refresh zone 210a-210e. In this example, the third threshold may be higher than the second threshold indicating a more immediate need to refresh the refresh zone 210a-210e. For example, the count value may exceed the third threshold while the corresponding refresh zone 210a-210e is awaiting refresh after exceeding the second threshold.

While refresh operations protect data integrity of the disk 60, the refresh operations may slow down the execution of commands from the host and/or other commands. For example, when the disk drive 100 is busy handling host commands, the user may experience an undesirable slow down of the command execution time while the disk drive 100 initiates and executes refresh operations in the background.

One method to reduce the impact of refresh operations is to clear a refresh counter under certain conditions without performing a refresh operation. This reduces the number of refresh operations that are performed in the background, thereby reducing the impact of the refresh operations on the execution of commands from the host and/or other commands. For example, when a host write command writes data to an entire refresh zone 210a-210e, the controller 10 may clear the corresponding refresh counter for the refresh zone 210a-210e since any degraded data in the refresh zone is overwritten. In this example, the controller 10 may determine when a host write command writes data to an entire refresh zone 210a-201e by determining when the range of LBAs in the host write command covers the entire range of LBAs associated with the refresh zone 210a-210e.

In one embodiment of the present invention, the controller 10 "piggybacks" on top of host access commands and/or other commands to check the condition of refresh zones 210a-210e and perform refresh operations.

When the controller 10 receives an access command (e.g., host write/read command) accessing a portion of a refresh zone 210a-210e, the controller 10 accesses the entire refresh zone 210a-210e to determine the condition of the refresh zone 210a-210e. For the example of a read command requesting data from a portion of a refresh zone 210a-210e, the controller 10 may read the entire refresh zone 210a-210e containing the data requested by the read command. For the example of a write command writing data to a portion of a refresh zone 210a-210e, the controller 10 may read data from the rest of the refresh zone 210a-210e. Thus, the refresh zone 210a-210e includes a portion being accessed by the access command and a portion not being access by the access command. The read data allows the controller 10 to determine the condition of the refresh zone 210a-210e, as discussed below.

Figure 3:
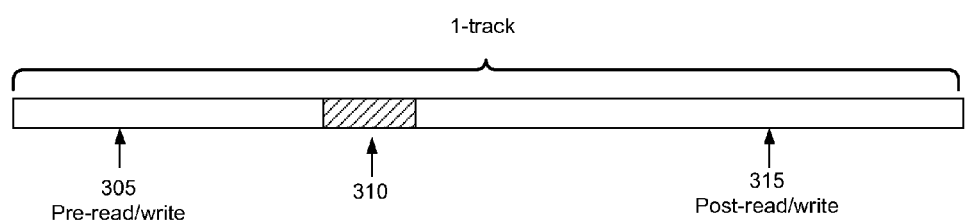
FIG. 3 shows an example of extending pre-read/write and/or post-read/write to access a track according to an embodiment of the present invention.

For the embodiment where a refresh zone 210a-210e includes a track 4, when an access command accesses a portion of the track 4, the controller 10 also reads data from the portion of the track 4 not being accessed by the access command. An example of this is shown in FIG. 3 in which an access command accesses a portion 310 of the track. In this example, the controller 10 may extend the lengths of the pre-read/write 305 and/or post-read/write 315 of the track to cover the entire track. The pre-read/write 305 may correspond to rotation of the disk 60 to position the head 50 at the portion 310 of the track being accessed by the access command. The post-read/write 315 may correspond to rotation of the disk 60 after the portion 310 of the track being accessed by the access command. In this embodiment, the controller 10 may read data during the pre-read/write 305 and post-read/write 315 to determine the condition of the refresh zone 210a-210e. An advantage of this embodiment is that it incorporates the rotational latency associated with positioning the head 50 at the portion 310 of the track being accessed by the access command to access the entire track. In this embodiment, the RPO algorithm may take into account that the pre-read/write 305 and/or post-read/write 315 are extended to cover the entire track when ordering the access command with other commands. For the example of a read command, the controller 10 may extend the pre-read 305 and/or the post-read 310 before and after the data 310 being requested by the read command to read the entire track.

After reading data from the refresh zone 210a-210e, the controller 10 uses the read data to determine the condition of the data in the refresh zone 210a-210e, and thus whether the refresh zone needs to be refreshed. The controller 10 may use the read data to determine the condition of the data in the refresh zone 210a-210e based on error correct code (ECC) symbol errors in the read data or other method, as discussed further below. If the controller 10 determines that the condition of the data in the refresh zone 210a-210e is bad, then the controller 10 may schedule the refresh zone 210a-210e for refresh. In this case, the controller 10 may refresh the refresh zone 210a-210e using the data already read from the refresh zone 210a-210e to determine the condition of the refresh zone 210a-210e. If the controller 10 determines that the condition of the data in the refresh zone 210a-210e is good, then the controller 10 may clear the corresponding refresh counter without performing a refresh operation. In another embodiment, the controller 10 may reduce the count value of the refresh counter to delay refresh and thus reduce the frequency of refresh operations, as discussed further below.

If the controller 10 checks the condition of the refresh zone 210a-210e in response to a host read command, then the controller 10 sends the portion of the read data corresponding to the data requested by the host read command to the host.

An advantage of this embodiment is that the controller 10 uses an access command accessing a portion of a refresh zone 210a-210e as an opportunity to read the refresh zone 210a-210e and determine the condition of the refresh zone 2101-210e. This saves time compared with the case where the controller 10 separately checks the condition of the refresh zone 210a-201e in the background in response to the corresponding refresh counter exceeding a threshold. Further, if the controller 10 determines to refresh the refresh zone 210a-210e, then the controller 10 can refresh the refresh zone 210a-210e using data already read from the refresh zone 210a-210e. If the controller 10 determines not to refresh the refresh zone 210a-210e, then the controller 10 can clear or reduce the corresponding refresh counter, thereby reducing the number of refresh operations that are performed in the background. Thus, the controller 10 is able to "piggyback" on top of access commands to reduce background activities associated with refresh and thus improve drive performance.

The controller 10 may also "piggyback" on top of other types of access commands to perform refresh operations. For example, the controller 10 may "piggyback" on read commands used in an internal scan to check the integrity of the disk 60. The controller 10 may also "piggyback" on a read modify write command, in which data is read from the disk 60, modified with new data, and written back to the disk 60. An example of a read modified write command is an unaligned sector write in which a portion of a data sector is modified with new data. In this embodiment, when the controller 10 receives a read modify write command, the controller 10 reads the corresponding refresh zone 210a-210e (i.e., the refresh zone including the data being read by the read modify write command). The controller 10 uses the read data to determine the condition of the refresh zone 210a-210e, and thus whether the refresh zone 210a-210e needs to be refreshed. If the controller 10 determines to refresh the refresh zone 210a-210e, then the controller 10 rewrites the read data that is not being modified back to the disk 60 along with the modified data.

In one embodiment, when the controller 10 receives an access command accessing a portion of a refresh zone 210a-210e, the controller 10 may determine whether to check the condition of the refresh zone 210a-210e based on the count value of the corresponding refresh counter. For example, if the count value is equal to or less than a threshold, then the controller 10 may skip checking the condition of the refresh zone 210a-210e. This is because a low count value may indicate that the condition of the refresh zone 210a-201e is likely good. If the count value exceeds the threshold, then the controller 10 may check the condition of the refresh zone 210a-210e as discussed above. An advantage of this embodiment is that the controller 10 does not need to extend the pre-read/write and/or the post-read/write to check the condition of a refresh zone 210a-210e when the count value of the corresponding refresh counter is low.

Methods for determining the condition of a refresh zone 210a-210e according to embodiments of the present invention are described below.

In one embodiment, the controller 10 performs an ECC scan of the data read from the refresh zone 210a-210e and determines the number of ECC symbols errors for each data sector of the read data. If the number of ECC symbol errors for each data sector is less than or equal to a threshold (e.g., nine ECC symbol errors), then the controller 10 may determine that the condition of the refresh zone 210a-210e is good. In this case, the controller 10 may clear or reduce the count value of the corresponding refresh counter. If the ECC symbol errors for any one of the data sectors exceed the threshold, then the controller 10 may determine that the condition of the refresh zone 210a-210e is bad. In this case, the controller 10 may schedule the refresh zone 210a-210e for refresh.

In another embodiment, the controller 10 may perform low-density parity-check (LDPC) to recover data read from the disk 10. In this embodiment, the controller 10 stores the data from the disk in a buffer, and corrects the data in the buffer in one or more iterations until the correct data is recovered. The number of iterations needed to obtain the correct data may then be used to indicate the quality of the data in the refresh zone 210a-210b with a lower number of iterations indicating higher data quality. In this embodiment, the controller 10 may determine that the condition of the refresh zone 210a-210e is good when the number of iterations is less than or equal to a threshold.

In one embodiment, when the controller 10 determines that the condition of a refresh zone 210a-210e is good, the controller 10 reduces the count value of the corresponding refresh counter by an amount based on the quality of the data in the refresh zone 210a-210e. For example, the controller 10 may reduce the count value of the refresh counter based on a number of ECC symbol errors in the refresh zone 210a-210e. The number of ECC symbol errors may correspond to the data sector having the highest number of errors in the refresh zone 210a-210e. In this example, the controller 10 reduces the count value by a larger amount when the number of ECC symbol errors is lower. In another example, the controller 10 may reduce the count value of the refresh counter based on a number of iterations required by an LDPC algorithm to obtain the correct data. In this example, the controller 10 reduces the count value by a larger amount when the number of iterations is lower. Thus, the controller 10 may scale the reduction of the count value based on the quality of the data in the refresh zone 210a-210e.

In this embodiment, if the quality of the data is high enough, then the controller 10 may clear the refresh counter back to zero. For example, the controller 10 may clear the refresh counter when the number of ECC symbols errors or number of iterations is equal to or less than a threshold, and reduce the count value of the refresh counter as described above when the number of ECC symbols errors or number of iterations exceeds the threshold, but is not high enough to consider the condition of the refresh zone 210a-210e bad.

In one embodiment, when the controller 10 determines that the condition of a refresh zone 210a-210e is bad, the controller 10 may schedule the refresh zone 210a-210e for refresh. The controller 10 may do this, for example, by marking the refresh zone as "dirty" in a buffer and sorting the refresh zone 210a-210e with other refresh zones 210a-210e scheduled for refresh. The refresh zones scheduled for refresh may be sorted based on the count values of their refresh counters, the quality of their data, and/or an RPO algorithm. For example, the controller 10 may sort the refresh zones so that refresh zones 210a-210e having higher count values are scheduled for refresh before refresh zones having lower count values. In another example, the controller 10 may sort the refresh zones so that the refresh zones having lower data quality (e.g., more ECC symbol errors) are scheduled for refresh before refresh zones having higher data quality (e.g., fewer ECC symbol errors). In yet another example, the controller 10 may sort the refresh zones based on an RPO algorithm to minimize mechanical latencies. The controller 10 may also use any combination of the above factors in sorting the refresh zones 210a-210e scheduled for refresh.

In one embodiment, when the controller 10 schedules a refresh zone for refresh, the controller 10 may generate a write command for rewriting the read data back to the disk 60 to perform the refresh operation. In this embodiment, the controller 10 may output the write command for the refresh to the command queue and use an RPO algorithm to sort the write command with other commands in the queue. For example, the controller 10 may sort the commands in the queue based on the RPO algorithm to minimize mechanical latencies. The other commands may include host commands and/or write commands for refreshes of other refresh zones 210a-210e.

In one embodiment, when the controller 10 determines that the condition of a refresh zone is bad, the controller 10 may increase the count value of the corresponding refresh zone above a threshold for triggering refreshes. The increase in the count value helps preserve the knowledge that the refresh zone 210a-210e needs to be refreshed.

As discussed above, when the controller 10 receives an access command, the controller 10 may perform pre-read/write and post-read/write before and after the portion of the track being accessed by the access command to read data from the refresh zone 210a-210e. In one embodiment, if the controller 10 encounters an error on any part of a pre-read/write and post-read/write read, then the controller 10 may execute a minimum number of retries in order to meet a command completion time. If the controller 10 is not successful after a number of retries, then the controller 10 may leave the corresponding refresh counter unaltered and allow refresh of the refresh zone 210a-210e to be triggered by the count value of the refresh counter exceeding a certain threshold.

Figure 4:
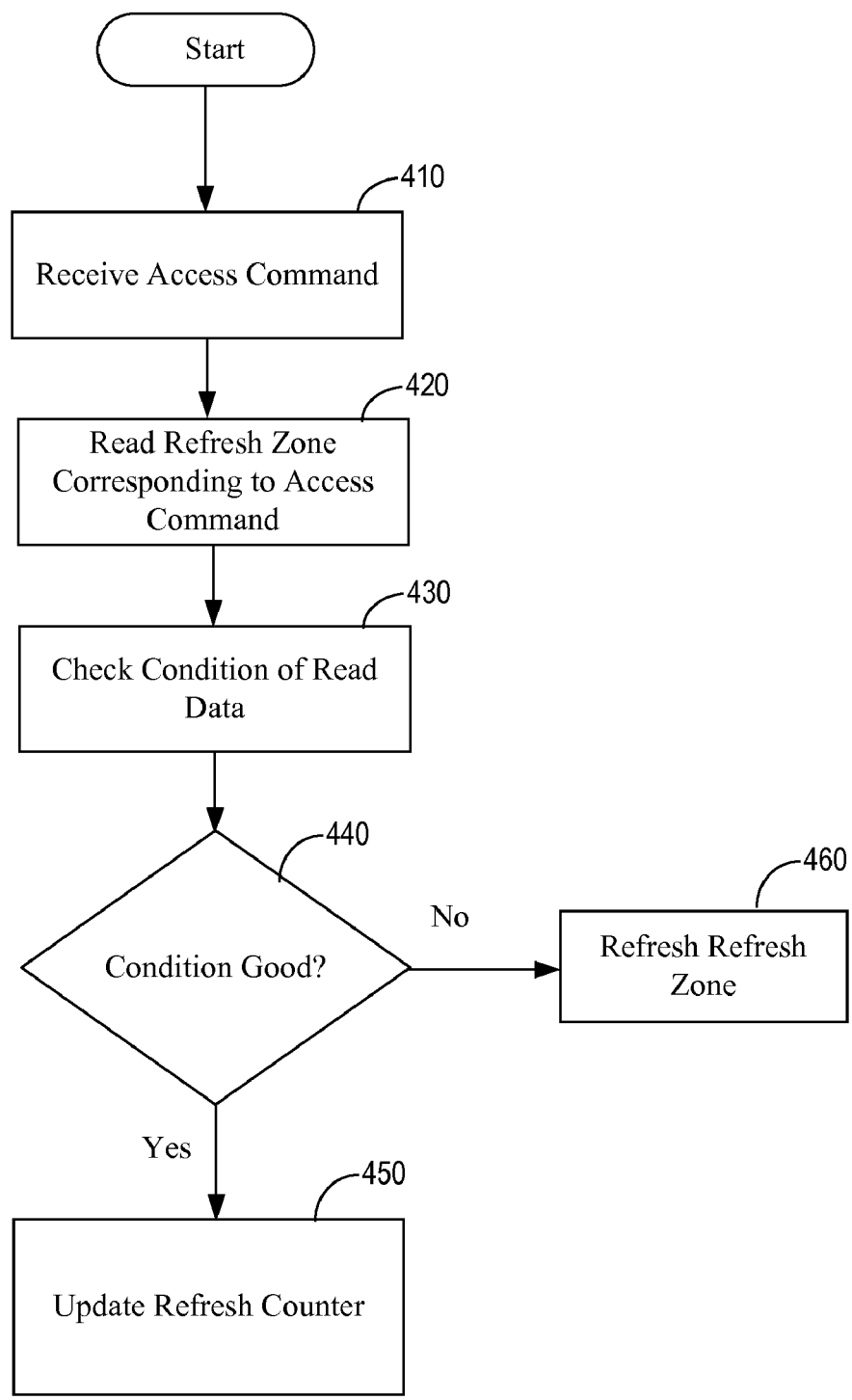
FIG. 4 is a flow diagram of a method for refreshing a disk drive according to an embodiment of the present invention.

FIG. 4 is a flowchart of a method for performing refresh according to an embodiment of the present invention. The method may be performed by the controller 10.

In step 410, an access command is received. The access command may be a host read/write command, a read command initiated by an internal scan to check the integrity of the disk 60 or other command. In step 420, the corresponding refresh zone 210a-210e is read. The refresh zone 210a-210e includes a portion being accessed by the access command and a portion not being accessed by the access command. For the example of a read command, the controller 10 may read the entire refresh zone 210a-210e including the data being requested by the read command. For the example of a write command, the controller 10 may read the portion of the refresh zone 210a-210e not being written to by the write command.

In step 430, the condition of the read data is checked. This may be done by performing an ECC scan of the read data, applying an LDPC algorithm to the read data to recover the correct data, and/or other method. In step 440, a determination is made whether the condition of the read data is good, and thus whether the condition of the data in the refresh zone 210a-210e is good. For the example in which an ECC scan is used, the read data may be considered good when the number of ECC symbols errors for each data sector is equal to or less than a threshold. For the example in which the LDPC algorithm is used, the read data may be considered good when the number of iterations needed to obtain the correct data is equal to or less than a threshold. If the condition of the read data is determined to be good, then the method proceeds to step 450. Otherwise, the method proceeds to step 460.

In step 450, the corresponding refresh counter is updated. For example, the refresh counter may be cleared back to zero.

In another example, the count value of the refresh counter may be reduced, for example, based on the quality of the read data. For example, the count value may be reduced by a larger amount when the quality of the data is higher (e.g., fewer ECC symbols errors or fewer iterations to obtain the correct data).

In step 460, the refresh zone is refreshed by rewriting the read data to the refresh zone. For the example of a write command, the write data in the write command is also written to the refresh zone. The refresh for the refresh zone may be scheduled with other refreshes for other refresh zones and/or other commands, as discussed above.

The controller 10 may check the condition of more than one refresh zone 210a-210e in response to an access command. For example, a read command may request data across two refresh zones 210a-210e. In another example, the controller 10 may check the refresh zone 210a-210e being accessed by the access command as well as adjacent refresh zones 210a-210e. For each refresh zone 210a-210e, the controller 10 may clear or reduce the count value of the corresponding refresh counter if the condition of the refresh zone 210a-210e is good and schedule the refresh zone 210a-210e for refresh if the condition of the refresh zone is bad.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A disk drive, comprising:
   a disk partitioned into a plurality of refresh zones;
   a head configured to write data to and read data from the disk; and
   a controller configured to receive an access command, to read data from a portion of at least one of the refresh zones using the head in response to the access command, to check a condition of the read data, and to determine whether to refresh the at least one refresh zone based on the condition of the read data, wherein the read data includes data from a portion of the at least one refresh zone not being accessed by the access command.

2. The disk drive of claim 1, wherein the at least one refresh zone includes a track of the disk, and the access command accesses only a portion of the track.

3. The disk drive of claim 2, wherein the at least one refresh zone corresponds to a single track of the disk.

4. The disk drive of claim 1, wherein the access command is initiated by a host device.

5. The disk drive of claim 1, wherein the access command comprises a read command.

6. The disk drive of claim 1, wherein, when the controller determines not to refresh the at least one refresh zone, the controller is configured to reduce or clear a count value of a refresh counter associated with the at least one refresh zone.

7. The disk drive of claim 6, wherein the controller is configured to increase the count value of the refresh counter when data is written to the at least one refresh zone or data is written to another one of the refresh zones.

8. The disk drive of claim 7, wherein the controller is configured to check the condition of data in the at least one refresh zone when the count value of the refresh counter exceeds a first threshold.

9. The disk drive of claim 8, wherein the controller is configured to refresh the at least one refresh zone when the count value of the refresh exceeds a second threshold, the second threshold being higher than the first threshold.

10. The disk drive of claim 6, wherein the controller is configured to determine a quality of the read data, and to reduce the count value of the refresh counter by an amount based on the quality of the read data.

11. The disk drive of claim 1, wherein the controller is configured to check the condition of the read data by performing an error correction code (ECC) scan of the read data, and to determine whether to refresh the at least one refresh zone based on one or more error counts obtained from the ECC scan, each error count corresponding to a sector in the at least one refresh zone.

12. The disk drive of claim 1, wherein the controller is configured to check the condition of the read data by applying a low-density parity-check (LDPC) algorithm to the read data and determining a number of iterations performed by the LDPC algorithm to obtain correct data from the read data, and to determine whether to refresh the at least one refresh zone based on the number of iterations.

13. The disk drive of claim 1, wherein the controller is configured to schedule the refresh of the at least one refresh zone based on a rotational position optimization (RPO) algorithm.

14. A method of refreshing in a disk drive including a disk partitioned into a plurality of refresh zones, comprising:
    receiving an access command;
    reading a portion of at least one of the refresh zones in response to the access command;
    checking a condition of the read data; and
    determining whether to refresh the at least one refresh zone based on the condition of the read data, wherein the read data includes data from a portion of the at least one refresh zone not being accessed by the access command.

15. The method of claim 14, wherein the at least one refresh zone includes a track of the disk, and the access command accesses only a portion of the track.

16. The method of claim 14, wherein the access command is initiated by a host device.

17. The method of claim 14, wherein the access command comprises a read command.

18. The method of claim 14, further comprising clearing or reducing a count value of a refresh counter associated with the at least one refresh zone when a determination is made not to refresh the at least one refresh zone.

19. The method of claim 18, further comprising increasing the count value of the at least one refresh zone when data is written to the at least one refresh zone or data is written to another one of the refresh zones.

20. The method of claim 18, further comprising determining a quality of the read data, and wherein the reducing the count value of the refresh counter comprises reducing the count value by an amount based on the quality of the read data.

21. The method of claim 14, wherein the checking the condition of the read data comprises performing an error correction code (ECC) scan of the read data, and the determining whether to refresh the at least one refresh zone is based on one or more error counts obtained from the ECC scan, each error count corresponding to a sector in the at least one refresh zone.

22. The method of claim 14, wherein the checking the condition of the read data comprises applying a low-density parity-check (LDPC) algorithm to the read data, and determining a number of iterations performed by the LDPC algorithm to obtain correct data from the read data, and the determining whether to refresh the at least one refresh zone is based on the number of iterations.

23. The method of claim 14, further comprising scheduling the refresh of the at least one refresh zone based on a rotational position optimization (RPO) algorithm.

* * * * *